US008731751B2

(12) United States Patent
Simon, Jr. et al.

(10) Patent No.: US 8,731,751 B2
(45) Date of Patent: May 20, 2014

(54) METHOD AND SYSTEM FOR CONTROLLING A HYBRID VEHICLE

(75) Inventors: Robert C. Simon, Jr., Brighton, MI (US); Christopher E. Whitney, Highland, MI (US); William R. Cawthorne, Milford, MI (US); John L. Lahti, Novi, MI (US); Douglas J. Babcock, Dexter, MI (US); Vivek Mehta, Bloomfield Hills, MI (US); Anthony H. Heap, Ann Arbor, MI (US); Todd R. Shupe, Milford, MI (US); Cheryl A. Williams, Howell, MI (US); Leonard G. Wozniak, Ann Arbor, MI (US); Ning Jin, Novi, MI (US); Birendra P. Bhattarai, Novi, MI (US); James L. Worthing, Munith, MI (US)

(73) Assignee: GM Global Technology Operations LLC

( * ) Notice: Subject to any disclaimer, the term of this patent is extended or adjusted under 35 U.S.C. 154(b) by 976 days.

(21) Appl. No.: 12/355,946

(22) Filed: Jan. 19, 2009

(65) Prior Publication Data

US 2009/0204280 A1 Aug. 13, 2009

Related U.S. Application Data

(60) Provisional application No. 61/026,951, filed on Feb. 7, 2008.

(51) Int. Cl.
*B60W 10/06* (2006.01)

(52) U.S. Cl.
USPC .................. 701/22; 701/51; 701/54; 701/99; 477/3; 477/4; 477/37

(58) Field of Classification Search
CPC ...................................................... B60W 10/00
USPC ..................... 701/22, 54, 51, 99; 477/3, 4, 37
See application file for complete search history.

(56) References Cited

U.S. PATENT DOCUMENTS

| 5,656,921 | A | 8/1997 | Farrall | |
|---|---|---|---|---|
| 7,057,304 | B2 * | 6/2006 | Ueda | 290/40 C |
| 7,757,666 | B2 * | 7/2010 | Whitney et al. | 123/481 |
| 2003/0145582 | A1 * | 8/2003 | Bunting et al. | 60/297 |
| 2003/0173123 | A1 * | 9/2003 | Nakanowatari | 180/65.2 |
| 2004/0237513 | A1 * | 12/2004 | Bunting et al. | 60/295 |
| 2005/0182526 | A1 * | 8/2005 | Hubbard et al. | 701/1 |
| 2005/0252474 | A1 * | 11/2005 | Sah et al. | 123/179.3 |
| 2005/0255965 | A1 * | 11/2005 | Tao et al. | 477/4 |
| 2005/0255966 | A1 * | 11/2005 | Tao et al. | 477/27 |
| 2005/0256623 | A1 * | 11/2005 | Hubbard et al. | 701/54 |
| 2005/0256629 | A1 * | 11/2005 | Tao et al. | 701/87 |
| 2005/0256631 | A1 * | 11/2005 | Cawthorne et al. | 701/99 |
| 2005/0278106 | A1 * | 12/2005 | Simon et al. | 701/70 |
| 2006/0194670 | A1 * | 8/2006 | Heap et al. | 477/3 |
| 2009/0118914 | A1 * | 5/2009 | Schwenke et al. | 701/51 |

* cited by examiner

*Primary Examiner* — John R Olszewski
*Assistant Examiner* — Truc M Do

(57) ABSTRACT

A hybrid controller for controlling a hybrid vehicle is set forth. The hybrid vehicle has an engine, an electric motor and an engine controller determining a crankshaft torque. The hybrid controller includes an optimization module determining an electric motor torque, determining an engine torque and communicating the engine torque from the hybrid controller to the engine controller. The hybrid controller also includes a motor control module controlling the electric motor based on the electric motor torque.

20 Claims, 4 Drawing Sheets

METHOD AND SYSTEM FOR CONTROLLING A HYBRID VEHICLE

CROSS-REFERENCE TO RELATED APPLICATIONS

This application claims the benefit of U.S. Provisional Application No. 61/026,951, filed on Feb. 7, 2008. The entire disclosure of the above application is incorporated herein by reference.

TECHNICAL FIELD

The present disclosure generally to hybrid vehicles and, more specifically, to a control module architecture for a hybrid vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque.

Hybrid vehicles are increasing in popularity. Some manufacturers are just beginning to implement hybrid strategies. Typically vehicle manufacturers have their own engine controllers but do not have a system for controlling a hybrid vehicle.

SUMMARY

This section provides a general summary of the disclosure, and is not a comprehensive disclosure of its full scope or all of its features.

The present disclosure provides a hybrid control system that includes a hybrid controller that may be a stand-alone module. The hybrid controller may be used to control the electric motor of the vehicle and optimize the engine and motor torques.

In one aspect of the disclosure, a method of controlling a hybrid vehicle having an engine and an electric motor includes, determining a crankshaft torque, communicating the crankshaft torque to a hybrid controller, determining an electric motor torque in the hybrid controller, determining an engine torque in the hybrid controller and communicating the engine torque from the hybrid controller to an engine controller.

In another aspect of the invention, a hybrid controller for controlling a hybrid vehicle is set forth. The hybrid vehicle has an engine, an electric motor and an engine controller that determines a crankshaft torque. The hybrid controller includes an optimization module determining an electric motor torque, determining an engine torque and communicating the engine torque from the hybrid controller to the engine controller. The hybrid controller also includes a motor control module controlling the electric motor based on the electric motor torque.

In a further aspect of the disclosure, a system for controlling a hybrid vehicle having an engine and an electric motor includes a hybrid controller and an engine controller in communication with the hybrid controller. The engine controller comprises an engine determination module determining a crankshaft torque and communicating the crankshaft torque to the hybrid controller. The hybrid controller determines an electric motor torque and determines an engine torque. The hybrid controller communicates the engine torque from the hybrid controller to the engine controller.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
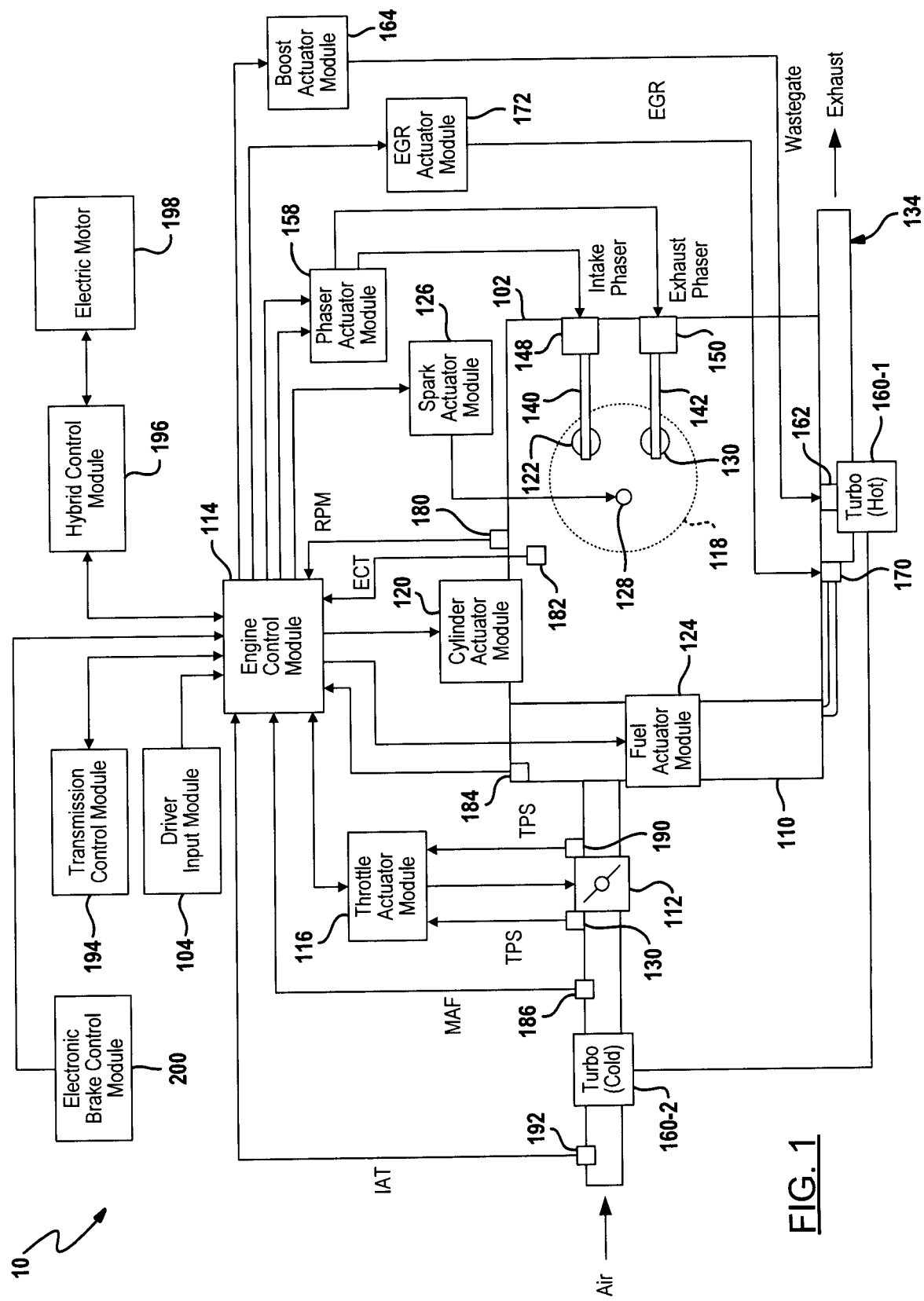
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A waste gate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the waste gate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198. The hybrid control module 196 may control for fuel economy or performance. The vehicle operator may be able to select the mode of operation.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

An electronic brake control module 200 may also communicate with the engine control module 114. Various torques associated with the electronic braking system may be factored into the torque control as will be described below.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
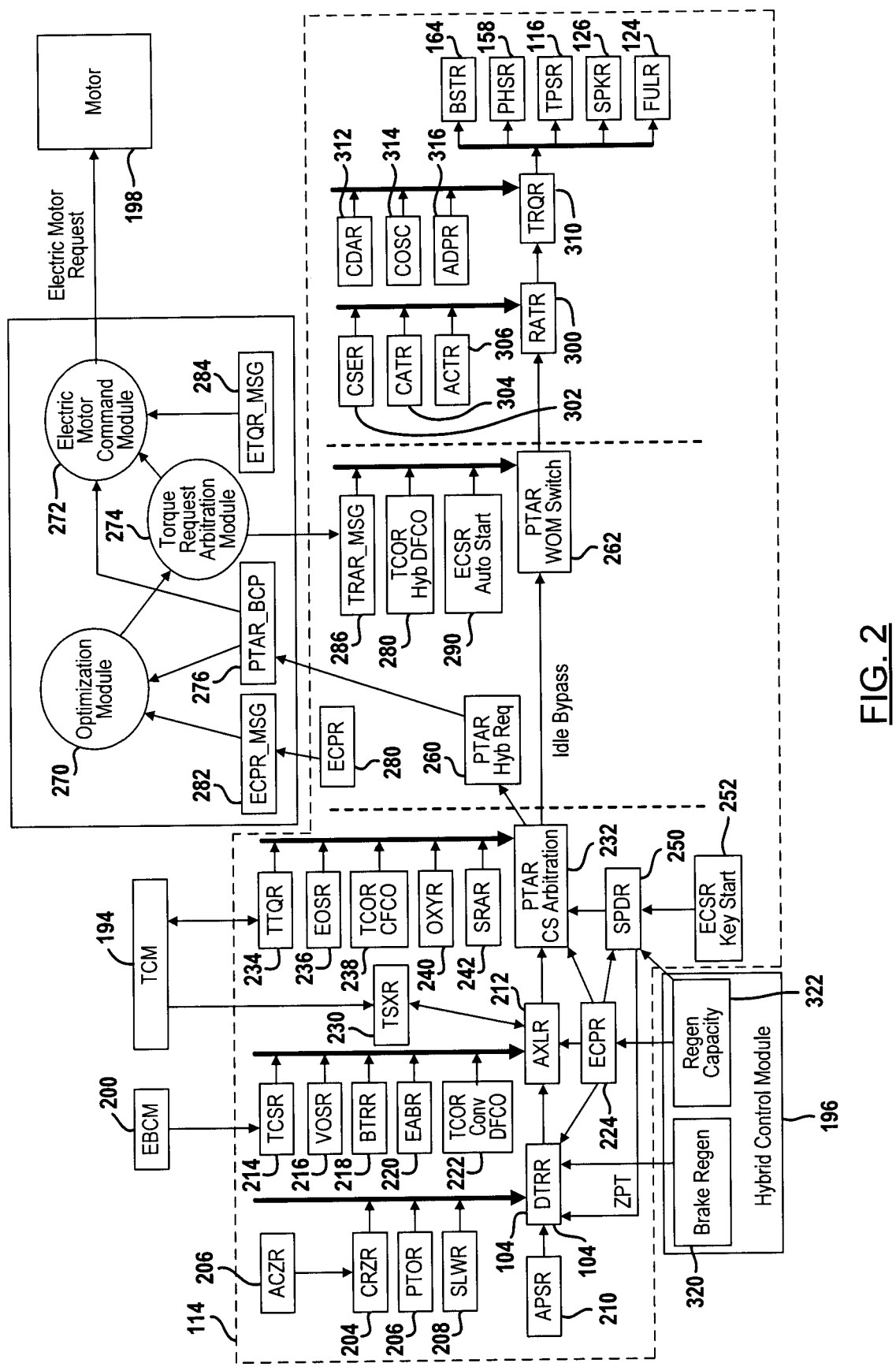
FIG. 2 is a detailed block diagram of an exemplary engine control system according to the principles of the present disclosure.

Referring now to FIG. 2, a functional block diagram of an exemplary engine control system is presented. Not all of the modules illustrated may be incorporated into a system. An exemplary implementation of the ECM 114 includes the driver input torque determination (DTRR) module 104 from FIG. 1. The driver input torque determination module 104 may receive various inputs including those from a cruise control (CRZR) module 204 which may include an active cruise control (ACZR) module 206. The driver input torque determination module 104 may also receive an input from a power take off (PTOR) module 206 used for farm implements and other power equipment. The driver input torque determination module 104 may also receive an input from a vehicle speed limiter (SLWR) module 208, which is used to warn the driver when a set speed is reached and which may reduce engine speed. An accelerator pedal sensing (APSR) module 210 may also provide an input torque to the driver input torque determination module 104 corresponding to the accelerator pedal sensor torque. The torques associated with the driver input torques are arbitrated with the accelerator pedal torque to form a driver axle torque request.

An axle torque arbitration (AXLR) module 212 is in communication with the driver input torque determination module 104. The axle torque arbitration module 212 arbitrates between a driver axle torque from the driver input module 104 and other axle torque requests. For example, the axle torque request derived from the electronic brake control (EBCM) module 200 illustrated in FIG. 1 may be provided. Such request may include a request from a traction/ drag control (TCSR) module 214, an input from a vehicle over speed protection (VOSR) module 216, an input from a brake torque management (BTRR) module 218, an input from an emergency autonomous braking module (EABR) module 220, and an input from a torque cut-off ring/deceleration fuel cutoff (TCOR/DFCO) module 222. The EABR module 220 may stop the vehicle by applying the brakes when an object in the vehicle path is sensed.

Both the driver input torque determination module 104 and the axle torque determination module 212 may receive an input from an engine capabilities and capacities module 224. The engine capability and capacities (ECPR) module may provide the engine capacity and capabilities corresponding to the engine combustion and hardware limitations.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 212 outputs an axle predicted torque and an axle immediate torque based on the results of arbitrating between the received torque requests. The axle predicted torque is the amount of torque that the ECM 114 prepares the engine 102 to generate, and may often be based on the driver's torque request. The axle immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 212 may convert the axle torque requests to crankshaft torque requests. The crankshaft torque and propulsion torque refer to the torque output at the shaft of the engine and measured at the input to the transmission. This is calculated by the TSXR module 230 using transmission and driveline ratios with information from the transmission control module (TCM) 194. The axle torque arbitration module 212 may output the predicted and immediate crankshaft torque to a propulsion torque arbitration module 232.

The propulsion torque arbitration (PTAR) module 232 arbitrates between crankshaft torque requests, including the converted crankshaft predicted and immediate torques from axle torque arbitration. The propulsion torque arbitration module 232 may generate an arbitrated predicted crankshaft torque and an arbitrated immediate crankshaft torque. The arbitrated torques may be generated by selecting a winning request from among received requests. Alternatively or additionally, the arbitrated torques may be generated by modifying one of the received requests based on another one or more of the received requests.

Other crankshaft torque requests provided to the propulsion torque arbitration (PTAR) module 232 may include a transmission torque request 234 from the transmission control module 194. An engine overspeed protection (EOSR) module 236 may also provide for a torque reduction. Other torque reductions may come from a torque cutoff ring clutch fuel cutoff 238, an OXYR module 240 for oxygen sensor service functions and a system remedial action (SRAR) module 242.

Propulsion or crankshaft torque requests may also result from clutch fuel cutoff, which may reduce the engine torque output when the driver depresses the clutch pedal in a manual transmission vehicle for shift flare reduction.

Propulsion or crankshaft torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module crankshaft arbitration function 232 may still receive these shutoff requests so that, for example, appropriate data can be fed back to other torque requesters. For example, all other torque requestors may be informed that they have lost arbitration.

An RPM control (SPDR) module 250 may also output predicted and immediate torque requests. The predicted torque is a leading request for slow actuator to actuate on and an immediate torque is for fast actuators. Fast actuators can act on the predicted request, but is done so in a fuel economy optimized fashion and with a filtered manifold like response. The requests are communicated to the propulsion torque arbitration module crankshaft arbitration function 232. The torque requests from the RPM control module 250 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 204 is less than a calibratable torque value.

The RPM control module 250 receives or determines a desired RPM and controls the predicted and immediate torque requests to reduce the difference between the desired RPM and the actual RPM. For example only, a linearly decreasing desired RPM for vehicle coast down may be provided until an idle RPM is reached. Thereafter, the idle RPM may be the desired RPM.

An engine crank and stop key start module 252 may provide an engine crank and stop signal to the idle speed control 252.

The propulsion torque arbitration module crankshaft arbitration function 232 may provide a signal to the powertrain arbitration (PTAR) module hybrid request module 260. The propulsion torque arbitration module crankshaft arbitration function 232 may also provide a signal to a propulsion torque arbitration module torque without electric motor (WOM) switch function 262. The propulsion torque arbitration module crankshaft arbitration function 232 may provide a signal to the propulsion torque arbitration module torque without electric motor switch function 262 when slow electric motor control is desired such as when a serial communication fault is detected or idling is desired. This mode may be called conventional generation where the electric motor would be used as a generator and change its torque more slowly. The hybrid control module may operate in another mode where it determines a without motor torque from the hybrid control module. This mode may be called hybrid optimization. When in this hybrid optimization mode, the propulsion torque request module will communicate predicted and immediate crankshaft requests to the hybrid control module 196. The hybrid control module will then determine how to achieve the requested crankshaft torque with the combination of electric motor torque from the electric motor 198 and engine torque without electric motor sent to the engine control module 114.

The hybrid control module 196 includes an optimization module 270, an electric motor command module 272 and a torque request arbitration module 274. The hybrid request signal is communicated from the propulsion torque arbitration hybrid request module 260 through a propulsion torque arbitration-hybrid control interface module 276. An engine capabilities and capacities module 280 may communicate engine capabilities and capacities through engine capability and capacity interface 282 which provides an engine capability and capacities signal to the optimization module 270. These engine capacities and capabilities are communicated in terms of engine torque without electric motor contribution (indicated combustion torque minus loads and pumping losses).

An engine torque estimation (ETQR) message module 284 receives an engine torque estimation message for the engine without motor (WOM) torque. The engine torque estimates without motor can be used by the electric motor command module 272 to determine the amount of electric motor torque necessary to achieve the desired crankshaft torque given the current engine torque without motor output. This is often necessary in modes where an immediate torque request is active and precise, fast control of crankshaft torque is preferred over optimal fuel economy. When performing in an optimal fuel economy mode, a gasoline engine has slow response when compared to an electric motor because of the response of the air actuation system. It is preferable to use the electric motor to reduce torque instead of spark retard because it is more fuel efficient. The formula under this immediate crankshaft torque request active may be desired electric motor torque=Immediate Crankshaft Request−ETQR Engine torque estimate without electric motor.

Based upon the engine operating conditions and the requested predicted crankshaft torque, the optimization module 270 can determine an optimal setting for both the electric motor torque and the torque for the engine. The optimization module 270 may optimize the engine torque and the motor torque for fuel efficiency. Thus, an optimized engine torque without electric motor and optimized motor torque may be generated. Under certain conditions the optimization module 270 may also optimize for performance. Optimization may vary the amount of engine and motor control based on predetermined operating characteristics. The characteristics may be calibrated into the system during development of the vehicle.

The torque request arbitration module 274 may determine how best to implement the torque request for the motor and the torque request for the engine. Due to mechanical changes and the time required to actually implement the torque request (based on the request being predicted or immediate), the torque requests may be ramped up or executed in a manner corresponding to the characteristics of the engine. That is, the engine capabilities and capacities as well as the motor capabilities are known by the torque request arbitration module 274. The electric motor torque request and the engine torque request may be implemented based on the capabilities. Various engines and various electric motors may have different characteristics and therefore the torque request arbitration module may be calibrated for different motor and engine combinations.

After the desired engine combustion torque is determined, it is sent back to the engine control module 114. The engine torque signal is sent from the hybrid control module to the engine control module in terms of crankshaft torque without electric motor influences. The crankshaft torque without electric motor influences is hereinafter called the (WOM). This is not merely engine combustion torque because the typical output of the engine is the engine combustion torque (also known as indicated torque) minus pumping losses and minus friction as well as air-conditioning load and power-steering load. The torque request arbitrator 274 may provide the torque request signal to the torque request arbitrator interface module 286. Ultimately the engine torque signal is provided to the propulsion torque arbitration module without motor (PTAR WOM) switch function 262. Also, a torque cut-off ring (TCOR) module 288 and an engine crank and stop module (ECSR) auto start function 290 may also provide inputs to the propulsion torque arbitration module without motor (PTAR WOM) switch function 262.

A reserves/loads (RATR) module 300 receives the torque requests from the propulsion torque arbitration module without motor (PTAR WOM) switch function 262. This torque request could come from the hybrid controller 196 in hybrid optimization mode or from the propulsion torque arbitration module crankshaft arbitration function 232 in conventional generation mode. Various engine operating conditions may affect the engine torque output. In response to these conditions, the reserves/loads module 300 may create a torque reserve by increasing the predicted torque request.

For example only, a cold start emissions reduction (CSER) process 302 may require retarded spark for catalyst light off. In a torque based system this can be accomplished by raising the predicted torque without motor request above the torque request without motor request from the propulsion torque arbitration module without motor (PTAR WOM) switch function 262 and then issuing an immediate torque without motor request at the same level as the torque request without motor request from the propulsion torque arbitration module without motor (PTAR WOM) switch function 262. This has the effect of raising the airflow above what is needed to achieve the torque request without motor request from the propulsion torque arbitration module without motor (PTAR WOM) switch function 262 and requiring spark retard to keep the torque down at the requested level. The catalyst diagnostic module (CATR) process 304 may require torque reserves to offset torque changes from intrusively changing the fuel equivalence ratio.

The reserves/loads module 300 may also create a reserve in anticipation of a future load, such as the engagement of the air conditioning compressor clutch or power steering pump operation in (ACTR) module 306. The reserve for air conditioning (A/C) clutch engagement may be created when the driver first requests air conditioning. Then, when the A/C clutch engages, the reserves/loads module 300 may add the expected load of the A/C clutch to the immediate torque request. The CSER 302 and CATR 304 reserve requests are specific to gasoline spark ignited engines. The ACTR reserve/load request module may be used on both gasoline spark ignited engines and diesel engines.

Torque actuation (TRQR) module 310 receives the torque requests from the reserves/loads module 300. The actuation module 310 determines how the torque requests will be achieved. The actuation module 310 may be engine type specific, with different control schemes for gas engines versus diesel engines. In various implementations, the actuation module 310 may define the boundary between modules prior to the actuation module 310, which is engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

A cylinder shut-off torque request module 312 may be used by a to determine how many cylinders to deactivate. The cylinder shut-off (CDAR) mode request module 312 may instruct the cylinder actuator module 120 to deactivate one or more cylinders of the engine 102. The CDAR module informs the torque control system how many cylinders are deactivated so that the torque control system may compensate with other actuators like more airflow to still achieve the desired crankshaft torque without motor. In various implementations, a predefined group of cylinders may be deactivated jointly. The cylinder shut-off torque (CDAR) request module 312 may also instruct a fuel control module to stop providing fuel for deactivated cylinders and may instruct the spark control module to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example, only valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves.

A converter oxygen storage capacity (COSC) module 314 may change the engine torque to determine a catalytic converter oxygen capacity after a DFCO flood. During a DFCO flood, the catalytic converter or other catalyst may be flooded with fuel and thus the spark may be needed to be retarded to achieve the desired torque without electric motor.

An active damping cancellation (ADPR) module 316 may also be included in the system. The damping cancellation module 316 may reduce driveline oscillation due to engine combustion pulses. This may be particularly useful for a vehicle equipped with a manual transmission.

The torque controller 310 may control various operating aspects of the engine which are also illustrated in FIG. 1. These include controlling the fuel actuator (FULR) module 124 that is used to determine a fuel mass for each cylinder that achieves the desired air fuel ratio or to determine the activation of each cylinder by injecting fuel or not. The fuel actuator module 124 injects the fuel mass for each activated cylinder. Under certain conditions a stoichiometric air/fuel ratio may be maintained.

The spark actuator (SPKR) module 126 is used to control the spark and the timing of the spark relative to a position in the cylinder such as top dead center.

A throttle actuator (TPSR) module 116 is used to control the opening and closing of the throttle to achieve the desired without motor torque.

A phaser (PHSR) module 158 is used to control the intake cam phaser and exhaust cam phasers to achieve the desired WOM torque. A booster (BSTR) module 164 is used to control the amount of intake air compression for the turbo or supercharger charger if the vehicle is so equipped. This is performed to also achieve the WOM torque from the torque controller 310.

A portion of the hybrid control module 196 is illustrated for convenience as separated from the remaining portions of the hybrid control module. However, these elements are intended to be included within the hybrid control module. A brake regeneration module 320 provides brake regeneration torque data to the driver torque module 104. A hybrid regeneration capacity module 322 provides the capacity for the electric motor to regenerate and apply negative torque to the system. The regeneration capacity module 322 may provide a regeneration capacity signal to the engine capabilities module 224 and to the idle speed control module 250. The engine capacities module 224 will combine the engine torque without motor capacities with the electric motor capacities to determine total crankshaft torque capacities. The torque arbitration modules AXLR 212 and PTAR's Crankshaft arbitration function 232 use the total crankshaft torque capacities to limit torque requests before arbitration.

Figure 3A:
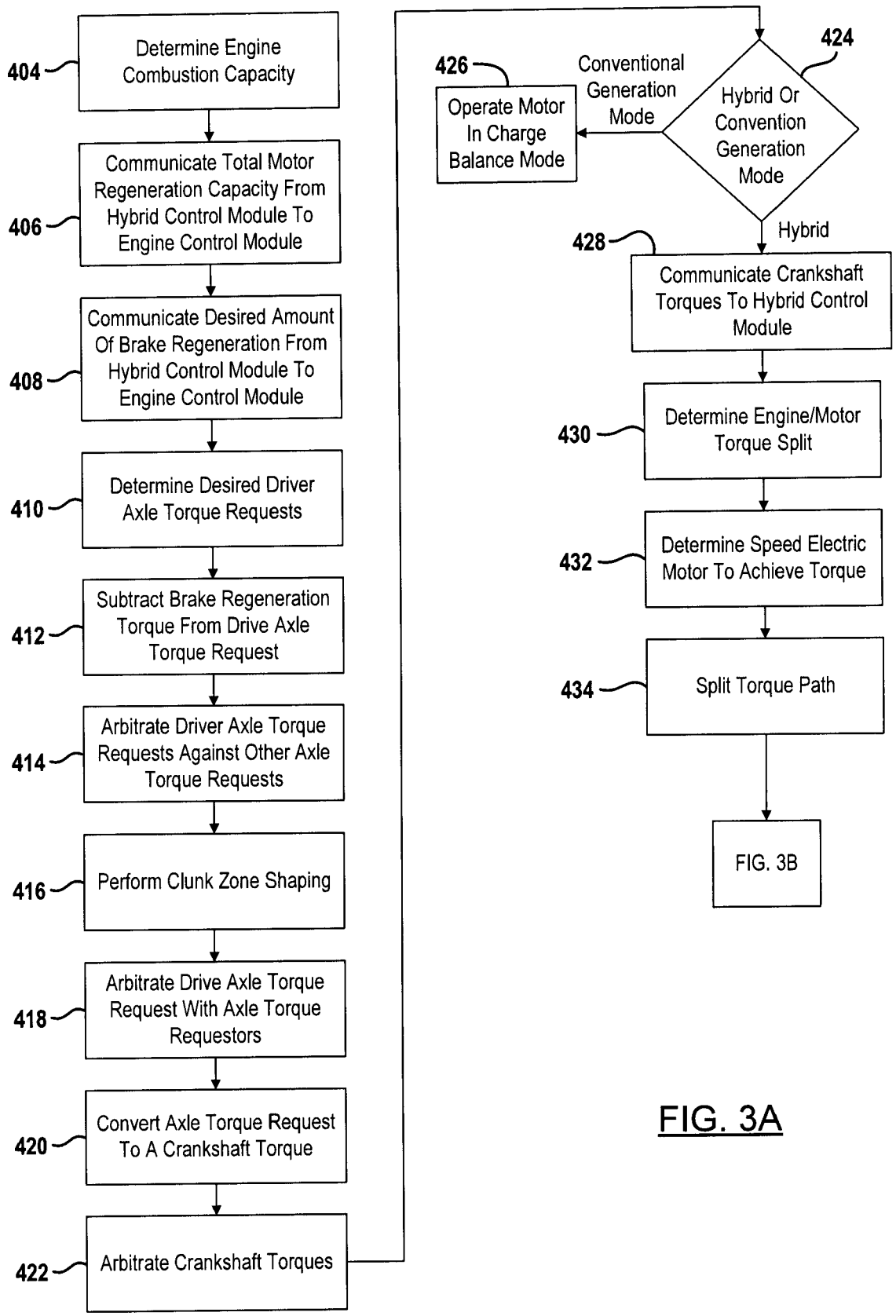
FIGS. 3A and 3B are a flowchart of a method of controlling a hybrid vehicle according to the principles of the present disclosure.
Figure 3B:
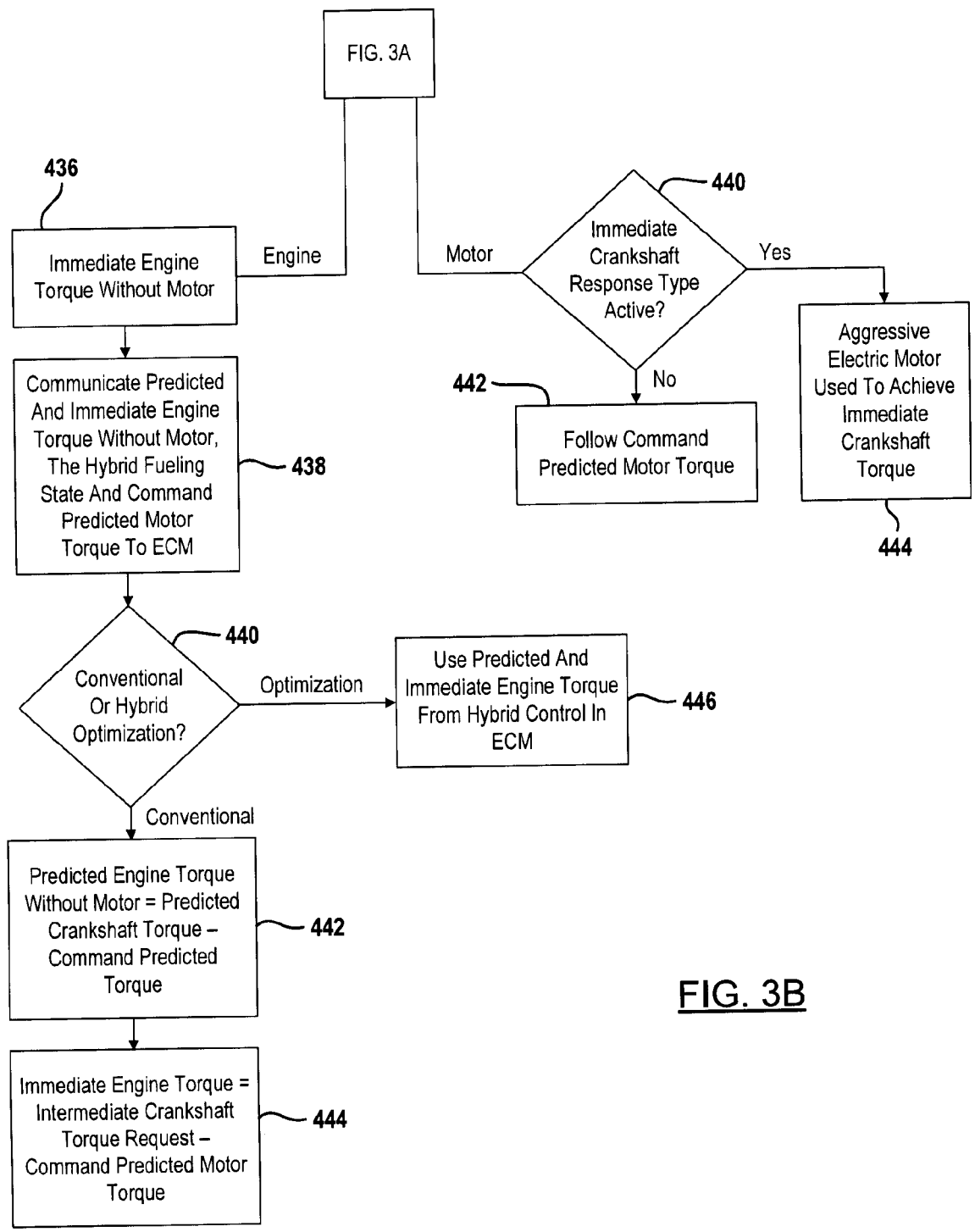

Referring now to FIGS. 3A and 3B, a method for controlling a hybrid vehicle is set forth. In step 404, the engine combustion capacity is determined. This may be determined in the engine control module. In step 406, a total motor regeneration capacity is communicated from the hybrid controller to the engine control module. In step 408, the desired amount of brake regeneration is communicated from the hybrid control module to the engine control module. In step 410 a driver torque request is determined from the accelerator pedal. Also, the engine combustion capacity and elective motor capacity are taken into consideration The brake regeneration axle torque is subtracted from the accelerator pedal determined desired axle torque to obtain a driver pedal desired axle torque in step 412.

In step 414, the driver pedal desired axle torque request is arbitrated against other driver axle torque requests that may be generated from cruise control input, power take-off inputs and the like to determine a desired driver axle torque.

Clunk zone shaping is performed on the final axle torque which corresponds to the final driver torque request from the DTRR 104 of FIG. 2. Clunk zone shaping refers to the modification of the raw desired axle torque through filtering, rate limiting or other methods to avoid torque bumps that can be felt when the drive line torque is reversing from positive to negative or negative to positive. In step 418, the driver axle torque request determined in step 416 is arbitrated with other axle torque requesters in the AXLR 212. The axle torque request may take into consideration requests originating from the electric brake module, the vehicle overspeed protection module, the traction and drag control module, the brake torque management module and the torque cutoff module. Also, the electric motor capabilities are taken into consideration when limiting requesters to the total propulsion system capacity. The arbitrated axle torque request is converted to a crankshaft torque in step 420. The crankshaft torque is communicated to the crankshaft arbitration module 232 illustrated in FIG. 2 above. In step 422, the crankshaft torque determined in the AXLR 212 is arbitrated against other sources of crankshaft torque. The other sources of crankshaft torque intervention requests may include the transmission control module shift torque management requests, the engine overspeed protection module, the manual transmission shift flare reduction (CFCO) module, the OXYR oxygen sensor service bay test module and the system remedial action module illustrated in FIG. 2.

In step 424, it is determined whether the hybrid system should be operating in the conventional generation mode or a hybrid optimization mode. The hybrid optimization mode shall be referred to as the hybrid control mode. If the hybrid system is to be operating in a conventional generation mode, it is supposed to operate the electric motor slowly in a charge balancing mode and not select fuel cut off. This mode may be selected when the engine is idling, the transmission is disengaged or if there is a serial data communications issue between the hybrid control module and the engine control module. The ECM may evaluate the crankshaft torque request and source of the crankshaft torque request to determine the hybrid control mode.

In step 428, the predicted and immediate crankshaft torque requests are sent to the hybrid control module along with the hybrid control mode and the immediate crankshaft torque response type. This immediate crankshaft torque response type indicates to the hybrid control system whether the immediate crankshaft torque request is active and what type of response it expects in terms of range, feel and time latency when exiting a reduction.

In step 430, the hybrid optimization system uses the predicted crankshaft torque to determine what the steady state split between electric motor torque and engine torque without electric motor should be. The cost of using fuel to create torque and the state of charge of the battery are also used for this purpose. The output of this optimization is the command predicted engine torque without motor, the desired fueling state and the desired predicted electric motor torque.

In step 432, the speed at which the electric motor is allowed to achieve the desired predicted electric motor torque is determined based on the hybrid control mode. If the control mode is conventional generation, then the command predicted motor torque will move slowly to the desired predicted motor torque and within some maximum and minimum limitations.

In step 434, the control flow splits into two paths engine torque without motor and electric motor.

In step 436, the engine torque without motor path uses the command predicted engine torque without motor, the desired fueling state and the command predicted motor torque from optimization. The immediate engine torque without motor torque is determined based on the electric motor capacity, the immediate crankshaft torque and immediate crankshaft torque response type. For gasoline engines there is a fuel economy penalty to scheduling spark retard, so the immediate engine torque without motor should be inactive unless the predicted or immediate crankshaft requests cannot be achieved with the electric motor. The predicted and immediate engine torque without motor, the desired hybrid fueling state, and command predicted motor torque are all sent to the ECM in step 438.

In step 440, control resumes on the engine torque without motor path in the ECM. The hybrid control mode that was determined earlier in the ECM is evaluated to determine whether the system is in conventional generation or hybrid optimization. If the hybrid control mode is conventional generation, then the predicted engine torque without motor calculated as the predicted crankshaft torque request minus the command predicted motor torque is determined in step 442. In conventional generation, the immediate engine torque without motor is calculated as the immediate crankshaft torque request minus the command predicted motor torque in step 444. This has the effect of bypassing the serial delays to the hybrid control module and back. This give the crankshaft torque requestors fast access to engine combustion actuators. If the hybrid control mode is hybrid optimization in step 440 then the predicted and immediate engine torque without motor that the hybrid control module requested will be used directly by the ECM in step 446.

Referring back to step 434, the electric motor side of the branch is followed. If the immediate crankshaft response type is inactive in step 440, then the electric motor torque will follow the command predicted motor torque that is determined by the hybrid optimizer in step 442. If the immediate crankshaft response type is active then the electric motor must be used more aggressively to achieve the immediate crankshaft torque by evaluating the engines estimate of torque output in step 444.

As can be appreciated, the hybrid control module 196 illustrated in FIG. 2 may be used to run various types of hybrid vehicles including strong hybrid and mild hybrids. Likewise, the engine control strategy may also be used to control solely gasoline or diesel powered engines. The present system provides a coordinated torque control architecture for reduction of cost. The hybrid control module 196 may be used alone for various manufacturers and incorporated into an overall powertrain system. The electric motor may perform various hybrid functions such as being used as a generator for coastdowns and regenerating the brakes and controlling the electric motor to provide assist when the driving condition is off idle and driving. In the present configuration the engine idle speed control is performed without the electric motor so that the hybrid control module may be easily incorporated into another manufacturer's powertrain control strategy. Normal engine control strategies, such as over-speed protection, cruise control and traction are all factored into the system. Likewise, the engine control strategy also operates seamlessly with a transmission controller. The combination of electric motor torque and the engine without motor torque may be communicated to various vehicle systems such as the transmission controller and antilock brake controller.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method of controlling a hybrid vehicle having an engine and an electric motor comprising:
   determining a crankshaft torque request;
   communicating the crankshaft torque request to a hybrid control module;
   determining an electric motor torque request in the hybrid control module using the crankshaft torque request;
   determining an engine torque request in the hybrid control module using the crankshaft torque request;
   communicating the engine torque request from the hybrid control module to an engine control module; and
   selectively bypassing the hybrid control module by controlling the engine independent from the engine torque request.

2. A method as recited in claim 1 wherein determining an engine torque request comprises determining a without motor torque, wherein the without motor torque is the crankshaft torque request without electric motor influences.

3. A method as recited in claim 2 wherein determining a without motor torque comprises determining the without motor torque based on at least one of engine pumping losses, friction, an accessory drive load, and an electric motor capacity.

4. A method as recited in claim 2 wherein determining an crankshaft torque request comprises determining an immediate crankshaft torque and a predicted crankshaft torque.

5. A method as recited in claim 1 wherein determining an electric motor torque request and determining an engine torque request comprises optimizing the electric motor torque request and the engine torque request for fuel economy.

6. A method as recited in claim 5 further comprising after optimizing, time adjusting an execution of the electric motor torque request and the engine torque request.

7. A method as recited in claim 5 wherein optimizing comprises optimizing the electric motor torque request and the engine torque request in response to engine capabilities and capacities.

8. A method as recited in claim 5 wherein optimizing comprises optimizing the electric motor torque request and the engine torque request in response to a predicted torque request and an immediate torque request.

9. A method as recited in claim 1 wherein determining an electric motor torque request and determining an engine torque request comprises optimizing the electric motor torque request and the engine torque request for vehicle performance.

10. A method as recited in claim 1 wherein determining a crankshaft torque request comprises determining a driver torque request, determining an axle torque request and determining a brake regeneration torque request.

11. A method as recited in claim 1 further comprising adjusting the engine torque request for a reserve load after communicating the engine torque request.

12. A method as recited in claim 1 wherein bypassing comprises determining a without motor torque in the engine control module based on the crankshaft torque request and a steady state electric motor torque, wherein the without motor torque is the crankshaft torque request without electric motor influences.

13. A method of controlling a hybrid vehicle having an engine and an electric motor comprising:
   determining a crankshaft torque;
   communicating the crankshaft torque to a hybrid control module;
   determining an electric motor torque in the hybrid control module using the crankshaft torque;
   determining an engine torque in the hybrid control module using the crankshaft torque;
   communicating the engine torque from the hybrid control module to an engine control module; and
   bypassing the hybrid control module by controlling the engine independent from the engine torque during idling of the vehicle or motor fault detection or serial data fault detection between the engine control module and hybrid control module.

14. A system comprising:

an engine control module that determines a crankshaft torque request; and a hybrid control module that determines an electric motor torque request and an engine torque request based on the crankshaft torque request, wherein the engine control module selectively controls an engine based on the engine torque request and the engine control module selectively bypasses the hybrid control module by controlling the engine independent from the engine torque request.

15. A system as recited in claim 14 wherein the engine torque request comprises a without motor torque, wherein the without motor torque is the crankshaft torque request without electric motor influences.

16. A system as recited in claim 15 wherein the without motor torque is based on engine pumping losses, friction, and an accessory drive load.

17. A system as recited in claim 14 wherein the hybrid control module comprises an optimization module that optimizes the electric motor torque request and the engine torque request for fuel economy.

18. A system as recited in claim 14 wherein the engine control module bypasses the hybrid control module during idling of a vehicle or motor fault detection or serial data fault detection between the engine control module and the hybrid control module.

19. A system as recited in claim 14 wherein the engine control module comprises a crankshaft determination module and the engine control module bypasses the hybrid control module by communicating the crankshaft torque request to a propulsion torque arbitration without motor switch module from the crankshaft determination module.

20. A system as recited in claim 14 wherein the engine control module bypasses the hybrid control module by determining a without motor torque based on the crankshaft torque request and a steady state electric motor torque, and the engine control module controls the engine based on the without motor torque, wherein the without motor torque is the crankshaft torque request without electric motor influences.

* * * * *